(12) United States Patent
Buchner et al.

(10) Patent No.: US 8,005,828 B2
(45) Date of Patent: Aug. 23, 2011

(54) LEARNING QUERY REWRITE POLICIES

(75) Inventors: Karolina Buchner, San Jose, CA (US);
Ralph Rabbat, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 319 days.

(21) Appl. No.: 12/026,376

(22) Filed: Feb. 5, 2008

(65) Prior Publication Data

US 2009/0198644 A1 Aug. 6, 2009

(51) Int. Cl.
*G06F 7/00* (2006.01)

(52) U.S. Cl. .................................................. 707/728

(58) Field of Classification Search .............. 707/2, 728
See application file for complete search history.

(56) References Cited

U.S. PATENT DOCUMENTS

2007/0208714 A1* 9/2007 Ture et al. ........................ 707/3

* cited by examiner

*Primary Examiner* — Apu M Mofiz
*Assistant Examiner* — Ajith Jacob
(74) *Attorney, Agent, or Firm* — Hickman Palermo Truong & Becker LLP

(57) ABSTRACT

A blended query rewrite provider takes as an input a search query and produces a list of query rewrite suggestions. The blended query rewrite provider generates suggestions by applying a number of individual query rewrite providers in series to a query. The sequence in which query rewrite providers are applied to a query is encoded in a query rewrite policy. Policies differ between query types. A policy application engine component selects which policy to apply to a given query based on the cluster to which a query belongs. The policy application engine uses a machine learning algorithm to assign a query to a cluster based on query features. The policy generation engine generates policies and trains the clustering algorithm used by the policy application engine offline based on training data sets and query logs.

16 Claims, 7 Drawing Sheets

LEARNING QUERY REWRITE POLICIES

FIELD OF THE INVENTION

The present invention relates to search engine query interpretation and determination of query rewrite policies.

BACKGROUND

Some search engine portals, in addition to listing of search results, provide users with terms related to the user's query called "Also-try" suggestions or suggestions. A suggestion is one or more ways of rewriting a query, and is also referred to herein as a query rewrite suggestion. For example, if a user were to submit a query "chicken" the search engine portal may return a suggestion that includes queries such as "chicken nuggets", "chicken soup recipes", "chicken recipes" etc. The suggestion let users conveniently refine their queries to get closer to the true intent of the original query. The suggestions are links which initiate a new search with the terms listed in the suggestion. A similar technology generates phrases that link to advertisements relevant to the user's query.

Suggestions are generated by query rewrite providers (QRPs) that generate suggestions using a particular approach or technique. There are a number of approaches QRPs use to generate a list of candidate suggestions. Some of the approaches are: UNITS, GOSSIP, SUBMARINE, Spell Checking, Stemming, MODS substitutions, Prisma, and Deletion Prediction. UNITS QRP generates suggestions based on the frequency analysis of separate elements making up the query. Element frequencies are extracted from query logs. GOSSIP technology is also based on information extracted from query logs; specifically query logs are analyzed for the query terms which were typed as a follow-up to the original query in an attempt to narrow or change the scope of the original query. MODS QRP is tuned to provide related advertisements. A SUBMARINE QRP predicts which term in a query can be deleted without altering the query's meaning. For example a SUBMARINE QRP would change "the show" to "show" while a query for the band "The Who" would remain unaltered. A spell checking QRP spell checks queries, for example "thaeter" would be changed to "theater". Prisma technology derives candidate suggestions from related sets of documents related to the query and may result in suggestions that do not resemble the original query. A stemming QRP changes queries, an example of stemming is "shows" changed to "show." Every QRP that alters the original query may actually disturb the original meaning so there is a confidence interval associated with every alteration.

Because individual characteristics or features such as length, dominant parts of speech, presence of geographical terms, digits, or stop words etc. differ between search queries, different rewrite techniques are effective for particular query types. For example, it is helpful to apply deletions to long queries such as "cheap car insurance", but not to one-word queries such as "nintendo", where either substitute terms or expansions are preferred. Therefore, no single QRP can successfully generate suggestions for all query types.

Individual QRPs generate a list of suggestion and rank each suggestion based on probability the suggestion will be deemed relevant by the user. QRPs rank suggestions using a scoring function. The scoring function is specific to each QRP, and therefore scores cannot be directly compared between different QRPs. Moreover some QRPs do not export the scores. For example Prisma technology does not provide any score for suggestions.

There is a clear need to create a query rewrite provider which effectively generates suggestions for different query types.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The coverage and quality of query rewrite suggestions is improved by applying various query rewrite providers in series to a query. For example, given a query "hotels in new york", a high quality suggestion may be obtained by applying a deletion transformation to obtain "hotels new york", followed by a substitution, leading to a final candidate such as "w hotel new york". Because current approaches are limited to a single query rewrite provider only "hotels new york" can be obtained.

A blended query rewrite provider (BQRP) applies multiple query rewrite providers to a query. A BQRP has an offline learning component and an online rewriting component. The offline learning component determines which one or more series of query rewrite providers are effective for a particular type of query. Various query features determine a query's type. A set of one or more series of query rewrite providers determined for a particular type of query is referred to herein as a query rewrite policy. The online rewriting component selects a query rewrite policy for a particular query based on features of the queries, to obtain a set of suggestions.

Figure 1:
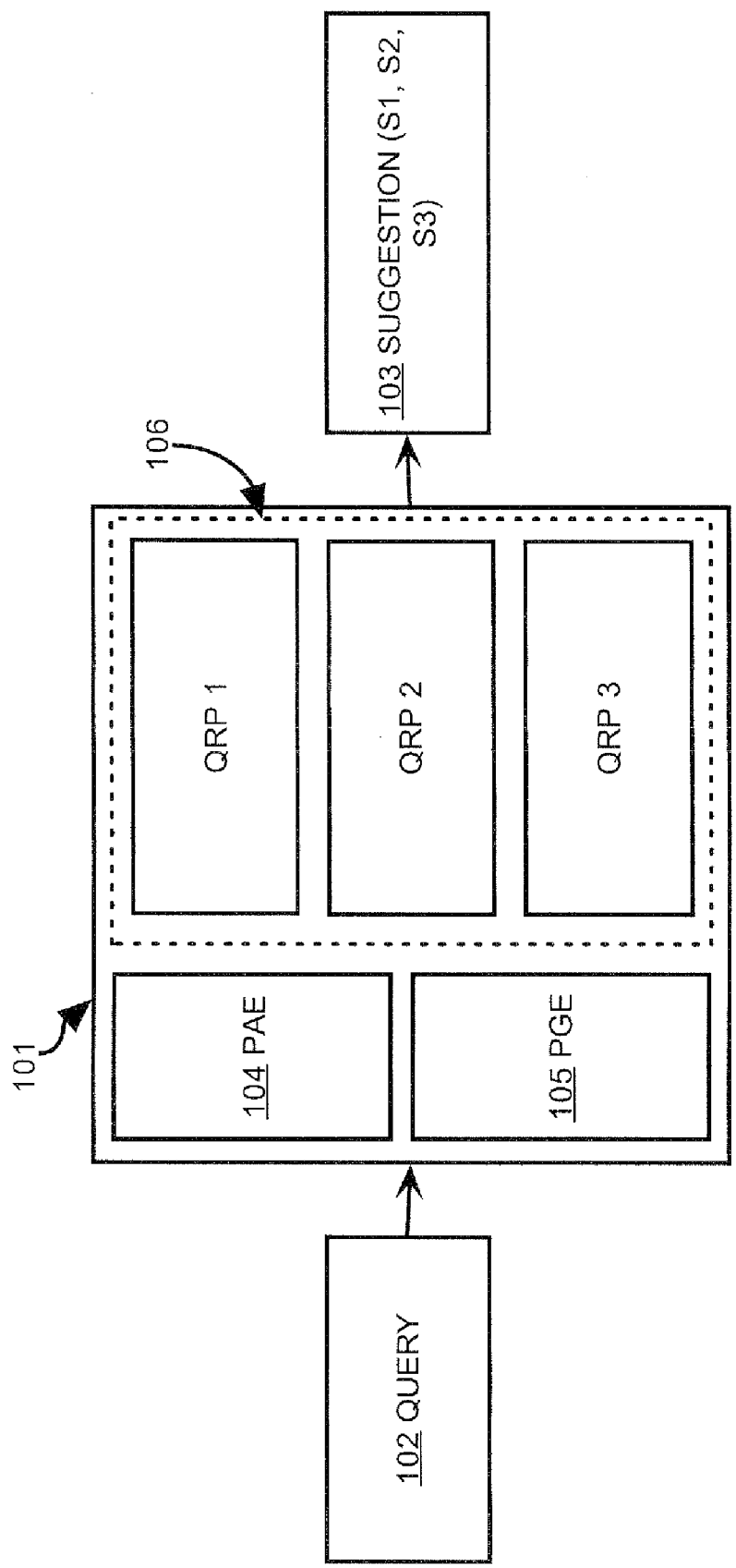
FIG. 1 is a high level diagram of a blended query rewrite provider according to an embodiment of the invention.

FIG. 1. is an architecture diagram of a blended query rewrite provider 101. The blended query rewrite provider takes as an input a search query 102 and produces a list of query rewrites or suggestion 103 as an output. The BQRP generates suggestions by selecting a query rewrite policy for the search query 102 based on the type of the search query 102 and applies the series query rewrite providers (QRPs) 106 in the query rewrite policy to search query 102. Various QRPs may be used such as UNITS, GOSSIP, SUBMARINE etc. The number of QRPs in a query rewrite policy is not limited. The order in which QRPs 106 are applied to a query 102 is encoded within the query rewrite policy. The policy application engine (PAE) 104 selects which query rewrite policy to apply to a given query based on features of the query.

The policy generation engine (PGE) 105 generates policies using a clustering algorithm and machine learning algorithm offline based on training data sets, which may be any set of arbitrary queries.

Policy Generation Engine

Figure 4:
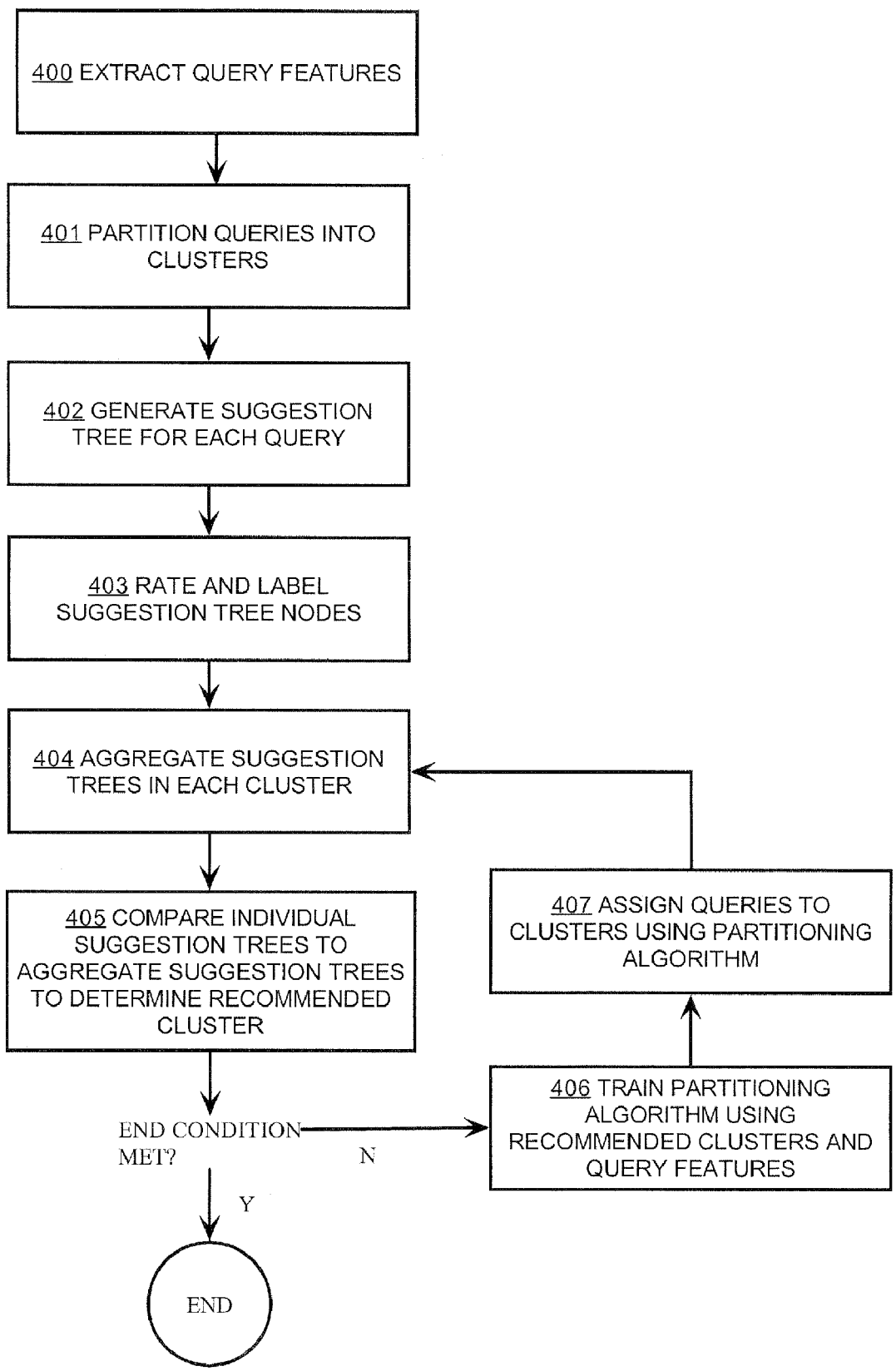
FIG. 4 is a flow chart of query rewrite policy generation according to an embodiment of the invention.

The PGE generates query rewrite policies and trains a query clustering algorithm in an iterative process. FIG. 4 is a flow chart of the operation policy generation engine. The PGE takes as an input a large sample of queries from, for example, search engine logs and as an output trains a query partitioning function and generates query rewrite policy for each cluster.

The PGE extracts a set of features from each query in the sample of queries in step 400. The features can be length, parts of speech such as nouns verbs articles, the category a query belongs to etc. The PGE initially partitions the sample of queries into K clusters in step 401. The number of clusters is adjustable and can be changed to tune how well each query rewrite policy matches individual queries. In one embodiment, the PGE initially partitions the queries by dividing the queries evenly among the K clusters. In other embodiments, the PGE may partition the queries based on features of the queries. Such partitioning may result in clusters containing unequal number of queries.

Suggestion Trees

In step 402, the PGE generates a suggestion tree for each query in each cluster.

Figure 2:
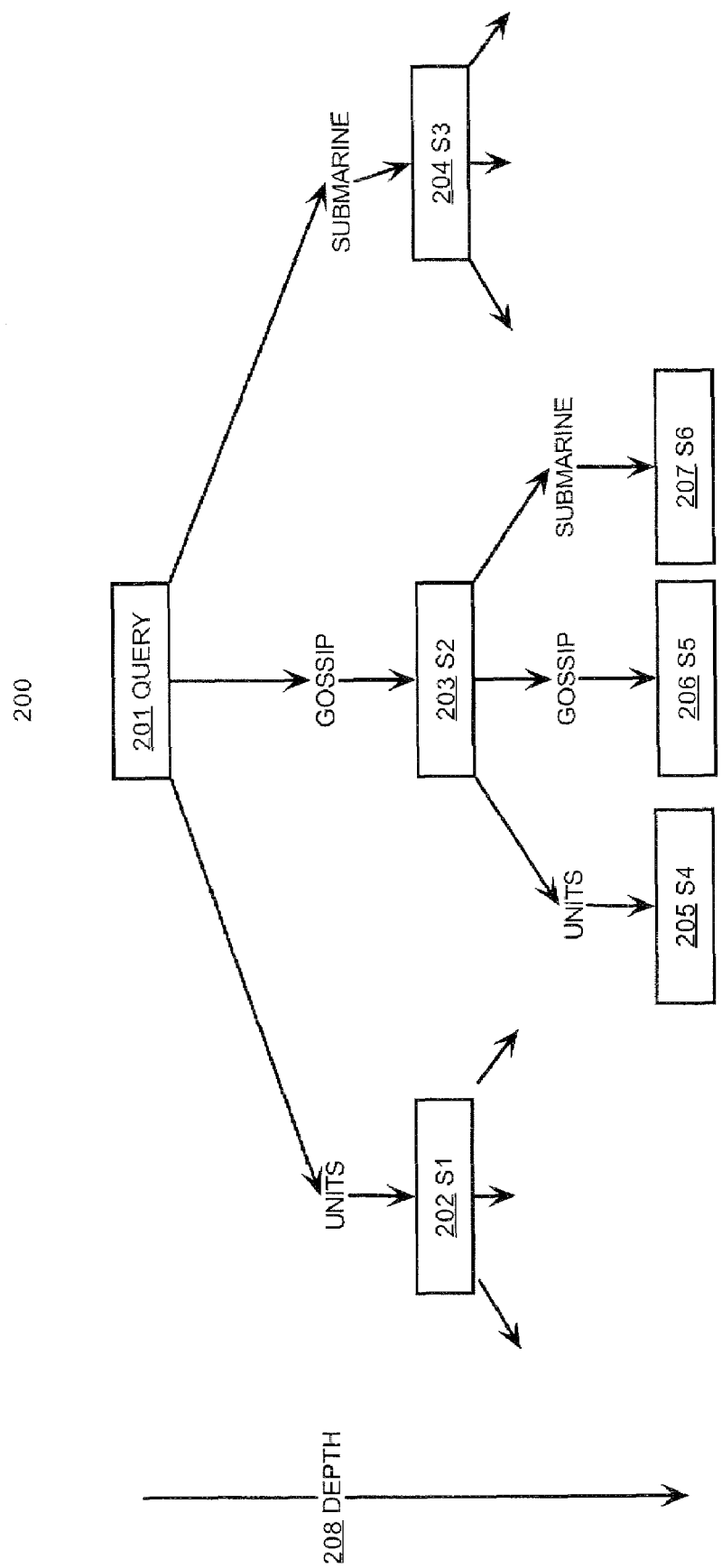
FIG. 2 is a query rewrite suggestion tree according to an embodiment of the invention.

A suggestion tree explores combinations in which the QRPs can be combined. The PGE builds a suggestion tree 200 of possible QRP combinations as illustrated in FIG. 2. The suggestion tree 200 is an N-arc tree where each arc represents a QRP and each node represents a result generated by applying the QRP. N is the number of QRPs. For illustration purposes only three QRPs are used, UNITS, GOSSIP, and SUBMARINE. However, more or less QRPs may be used. The root node of the suggestion tree 200 is the original search query 201.

A child node of a parent represents the suggestion generated by application of the QRP of the arc connecting the child to the parent. For example, children nodes of the original query 201 are S1 202, S2 203, and S3 204. S1 202 is obtained by passing the query 201 through the UNITS QRP, S2 203 is obtained by passing the query 201 through GOSSIP QRP, and S3 204 is obtained by passing the query 201 through SUBMARINE QRP. The next level of the suggestion tree 200 is derived by using the suggestion of the previous level as an input to the QRP, so S4 205 is obtained by passing S2 203 through the UNITS QRP, S5 206 by passing S2 203 through the GOSSIP QRP, and S6 207 by passing S2 203 through the SUBMARINE QRP. The other nodes are derived in a similar fashion. If during generation of a suggestion tree 200 a node is identical to its parent, the PGE may not calculate any more children for that node.

The suggestion tree 200 is built to depth 208, where depth 208 is an adjustable parameter. Typically, depth 208 is picked to be at the threshold of where the suggestions remain on topic with the original query 201.

For example, a query 200 may be "how to make chicken soup," the query 200 will be transformed to "chicken soup" by a SUBMARINE QRP to create S3 204 and the suggestion "chicken soup" will be transformed to "chicken soup recipes," S4 205, by the UNITS QRP. The tree 200 stores all the generated suggestions.

Suggestion Scoring Function

In step 403, the PGE uses a suggestion scoring function to rate and label every node (i.e. suggestion) in a suggestion tree 200 as a "good" suggestion or "bad" suggestion for every query in every cluster. A "good" node may represent and is deemed an effective or higher quality query series of QRPs for rewriting that particular query. That is, the QRPs of arcs in the path leading to a "good" node are deemed an effective way of rewriting the query. For example, if 203 S2 and 207 S6 are "good" nodes, then a series of QRPs that applies only GOSSIP, or that applies GOSSIP followed by SUBMARINE, may be effective series for rewriting policy for search query 201.

In an embodiment, the suggestion scoring function takes two parameters as inputs, a query and a suggestion generated for that query. The output of the scoring function is a label, for example "good" or "bad." In other embodiments, the scoring function can assign more than two labels. For example numbers 1 through 10 may be used as labels.

The scoring function is applied to all suggestion trees in all clusters. Thus, each cluster includes a suggestion tree for each query in the cluster.

Generating Aggregate Tree for Each Cluster

In step 404, the PGE aggregates all suggestion trees in a cluster to generate an aggregate suggestion tree representing an aggregation of suggestion trees in the cluster. Step 404 is repeated for every cluster.

Figure 3:
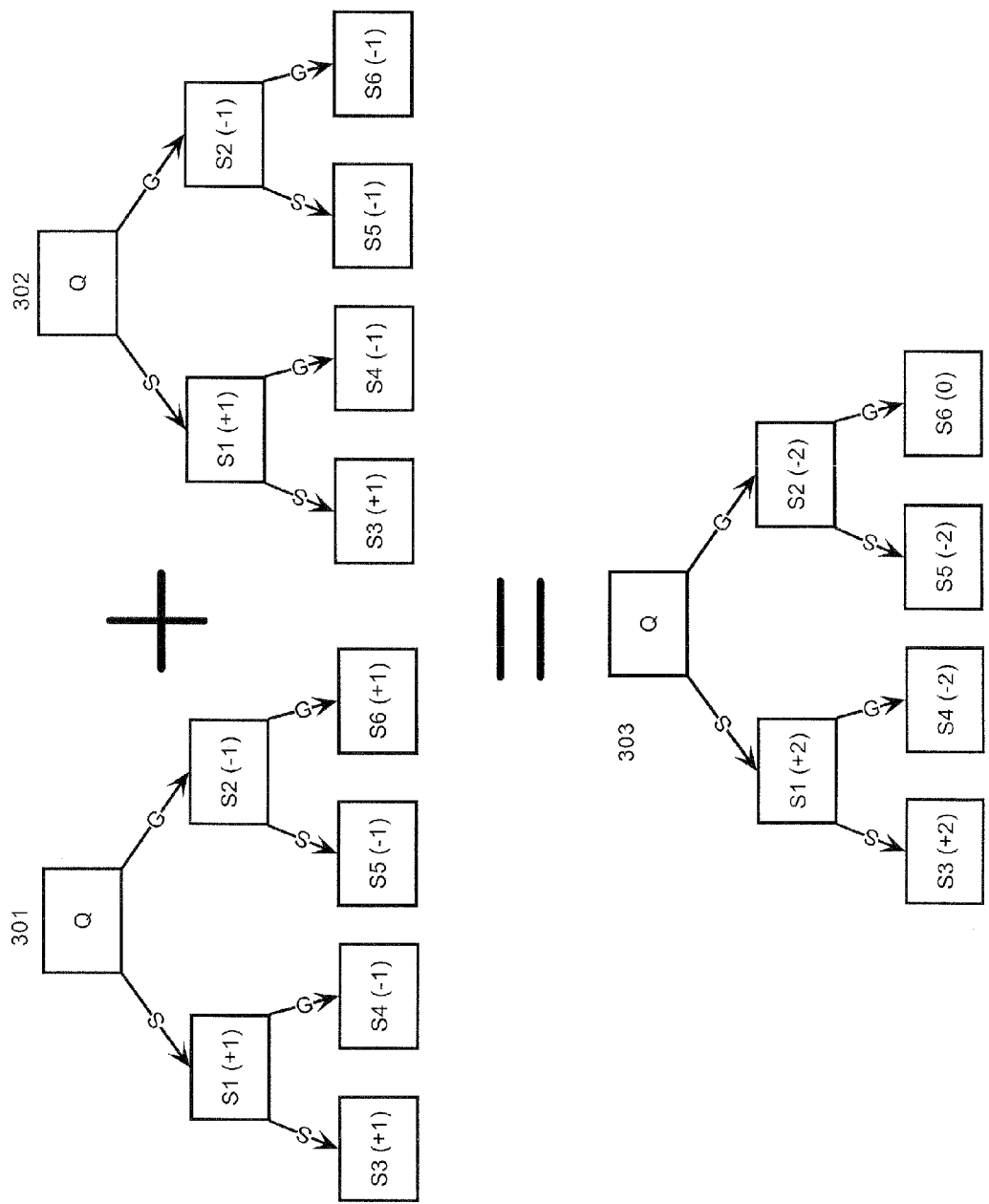
FIG. 3 is an illustration of suggestion tree aggregation according to an embodiment of the invention.

FIG. 3 illustrates how the PGE combines two suggestion trees 301 and 302 to form an aggregate suggestion tree 303. The suggestion trees in FIG. 3 use two QRPs SUBMARINE and GOSSIP represented by letters S and G respectively. First, the PGE encodes every suggestion label "good" as +1 and "bad" as −1. In another embodiment of the invention, the suggestion scoring function may apply labels as +1 and −1 which will eliminate the encoding step. The PGE then adds all the values for each node for every suggestion tree to create an aggregate suggestion tree. For example the value of S1 in suggestion tree 301 (+1) is added to the value of S1 in suggestion tree 302 (+1) to generate S1 value in aggregate tree 303 (+2). The same is done for other nodes. As a result the respective accumulated values of each positions of the aggregate suggestion tree 303 may become a large positive or negative number.

An aggregate suggestion tree determines the query rewrite policies for the cluster. The nodes with the highest accumulated values represent a series of QRP in a query rewrite policy. The top M nodes, the M nodes with the highest accumulated values of the aggregate suggestion tree, are determined. The series of QRPs represented by each of the M nodes become members of the cluster query rewrite policy for that cluster.

Note that each node of an aggregate suggestion tree encodes the number, type and the order in which QRPs are to be applied to a query to arrive at a suggestion. In the preceding example S1 indicates that SUBMARINE is to be applied to a query to generate a suggestion, S3 indicates SUBMARINE followed by SUBMARINE, and S3 indicates that in order to arrive at a suggestion GOSSIP followed by GOSSIP is to be applied to a query.

Determining Recommended Cluster for a Query

A comparison of the suggestion tree of a query to the aggregate tree of a cluster determines how effective the query rewrite policy of the cluster is for the query. Corresponding nodes in a suggestion tree and an aggregate suggestion tree are considered to be overlapping if (1) the nodes are associated with the same label, e.g. "good" in both trees, and (2) the node in the aggregate tree is among the top M nodes for the aggregate tree. If, for example, corresponding nodes are associated with the same "good" label in both the suggestion tree and aggregate tree, but the respective node in the aggregate tree is not among the top M nodes, the corresponding nodes are not overlapping. For example, node S1 in suggestion tree 301 and node S1 in aggregate suggestion tree 302 are overlapping. The degree of overlap between a suggestion tree and aggregate suggestion tree is the number of nodes that are overlapping. The degree of overlap between suggestion trees of the queries and the aggregate may be used to train a partitioning function that may be used to partition or repartition the queries into clusters based on features of the queries.

Query Partitioning Function

In step 405, for each suggestion tree generated for a query, the suggestion tree is compared to the aggregate trees of each cluster. The PGE determines which aggregate suggestion tree among the clusters has the highest degree of overlap. The cluster of that aggregate suggestion tree becomes the recommended cluster for the query.

In step 406, the PGE trains a query partitioning function using as input the recommended clusters generated for each query and the features of the queries.

The query partitioning function may be generated by a decision tree machine learning algorithm. In other embodiments of the invention alternate machine learning algorithms may be used. The query partitioning function uses the query features extracted in step 400 and the recommendations generated in step 405 as training data.

The trained query partitioning function assigns queries to clusters based on query features. Given a set of query features, the partitioning function generates a cluster identifier identifying the cluster assigned.

In step 407, the PGE uses a query partitioning function to re-assign queries to clusters based on query features. The PGE then resumes processing in step 402.

If an ending condition is reached, execution of the loop represented by steps 404-407 is ceased. An ending condition may be that recommended clusters generated in an iteration of the loop for a threshold portion of the queries are the clusters in which the queries are currently assigned.

Query Rewrite Policy Table

Figure 5:
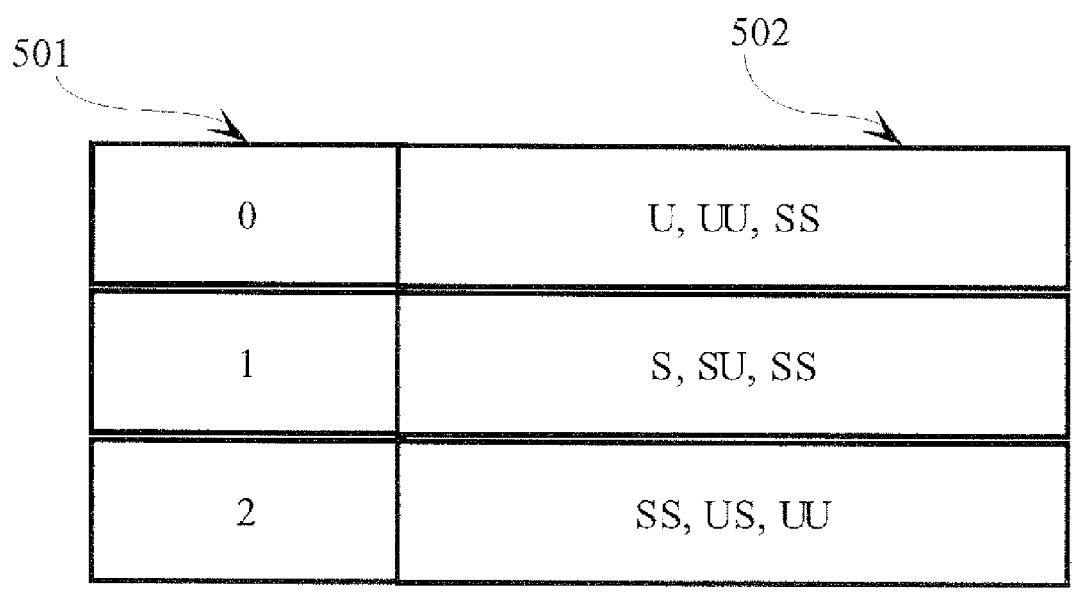
FIG. 5 is a policy table according to an embodiment of the invention.

Next, the PGE populates the query rewrite policy table.
FIG. 5 depicts a query rewrite policy table. The query rewrite policy table consists of 2 columns. Column 501 stores the cluster indentifiers. Column 502 stores data representing the query rewrite policy associated with the cluster. The query rewrite policy is ordered such that the series of QRPs with the highest accumulated value in the cluster's aggregate suggestion tree is at the head of the list.

Policy Application Engine

Figure 6:
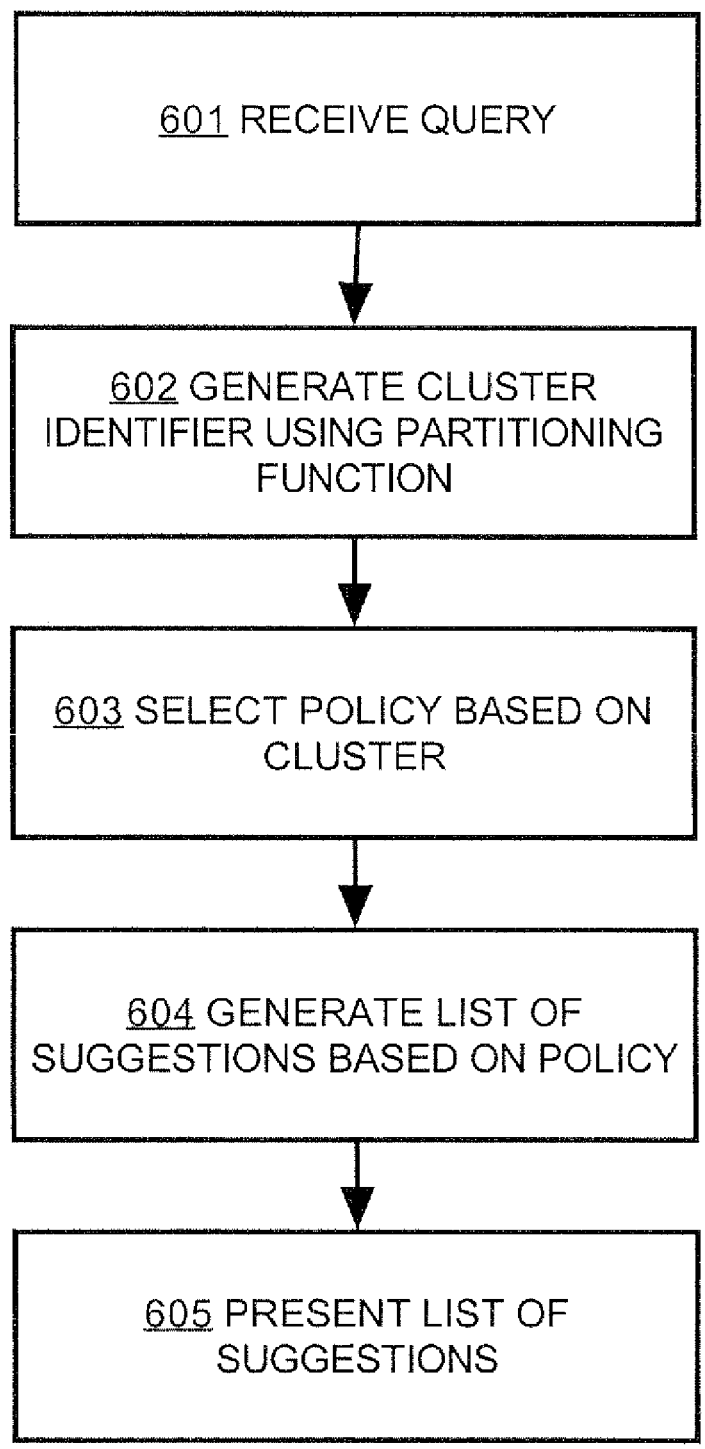
FIG. 6. is a flow chart of query rewrite generation to an embodiment of the invention.

FIG. 6 is a flowchart of the operation of a policy application engine. The PAE receives a user query in step 601. In step 602, the PAE generates a cluster identifier query using the query partitioning function which was trained in step 407. In step 603, the PAE selects a query rewrite policy associated with the cluster identifier by the query rewrite table. In step 604, the PAE generates a list of suggestions by applying query rewrite providers 106 in the order dictated by the query rewrite policy contained in column 502 of the query rewrite policy table. In step 605, the PAE presents suggestion to the user.

Hardware Overview

Figure 7:
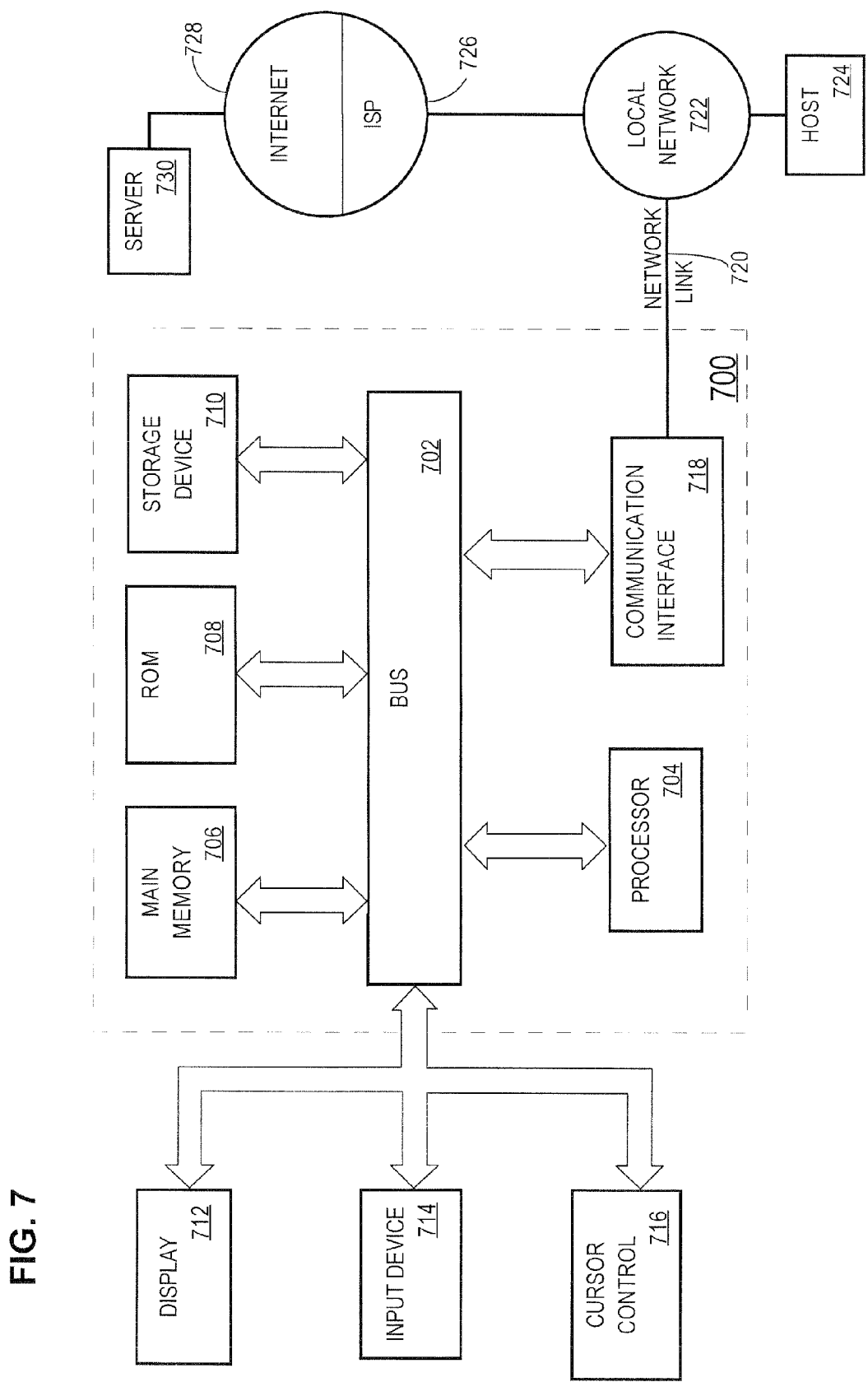
FIG. 7 is a computer system upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method comprising:
  partitioning a plurality of queries into a plurality of clusters, each cluster containing a plurality of queries;
  (a) for each query of the plurality of queries, generating a plurality of suggested rewrites, wherein each suggested rewrite of said plurality of suggested rewrites is the result of applying a query rewrite policy, the query rewrite policy being an ordered set of one or more query rewrite techniques, each query rewrite technique of said one or more query rewrite techniques being provided by a query rewrite provider of a plurality of query rewrite providers;
  (b) for each query, generating a set of rewrite scores, wherein each rewrite score of said set of rewrite scores reflects the quality of a particular suggested query rewrite generated for the query by a respective query rewrite policy;
  (c) for each cluster, generating aggregate rewrite scores by aggregating the rewrite scores of the same query rewrite policy for the same cluster;
  (d) based on the aggregate rewrite scores generated, query features of each query of said plurality of queries, and the rewrite scores generated for each query of the plurality of queries, generating a partitioning function by which to partition said plurality of queries into clusters;
  (e) based on the partitioning function, repartitioning said plurality of queries into a new set of clusters;
  repeating steps (a), (b), (c), (d) and (e) one or more times; and
  wherein the steps are performed by one or more computers.

2. The method of claim 1, wherein the step of generating a query partitioning function includes:
  for each query of said plurality of queries, selecting a recommended cluster based on a comparison of the rewrite scores generated for said each query and the aggregate scores generated for the recommended cluster; and wherein generating the partitioning function is based on the recommended cluster selected for each query of said plurality of queries.

3. The method of claim 1, for each cluster, selecting a subset of a threshold number of query rewrite policies that are associated with highest aggregate scores;

selecting a recommended cluster based on a comparison of the rewrite scores generated for said each query and the aggregate scores generated for the subset of the threshold number of query rewrite policies; and wherein generating the partitioning function is based on the recommended cluster selected for each query of said plurality of queries.

4. The method of claim 1, wherein for a given rewrite policy the respective query rewrite providers is capped at a particular number of query rewrite providers.

5. The method of claim 1, wherein a given rewrite policy involves multiple applications of the same query rewrite technique.

6. The method of claim 1 wherein any query policy is capped at a particular number of query rewrite techniques for all queries.

7. The method of claim 1, wherein:

the step of generating the plurality of suggested rewrites involves, for each query of said plurality of queries, creating a tree of nodes, wherein arcs between the nodes lead from a parent node to a child node, wherein each arc represents a query rewrite technique of a query rewrite provider of said query rewrite providers, wherein each descendant node represents a query rewrite policy comprising each query technique associated in the set of one or more arcs that lead from the root node to said each node.

8. The method of claim 1, wherein the root node represents the query.

9. A non-transitory computer readable medium carrying one or more sequences of instructions, wherein execution of the one or more sequences of instructions by one or more processors causes the one or more processors to perform the steps of:

partitioning a plurality of queries into a plurality of clusters, each cluster containing a plurality of queries;

(a) for each query of the plurality of queries, generating a plurality of suggested rewrites, wherein each suggested rewrite of said plurality of suggested rewrites is the result of applying a query rewrite policy, the query rewrite policy being an ordered set of one or more query rewrite techniques, each query rewrite technique of said one or more query rewrite techniques being provided by a query rewrite provider of a plurality of query rewrite providers;

(b) for each query, generating a set of rewrite scores, wherein each rewrite score of said set of rewrite scores reflects the quality of a particular suggested query rewrite generated for the query by a respective query rewrite policy;

(c) for each cluster, generating aggregate rewrite scores by aggregating the rewrite scores of the same query rewrite policy for the same cluster;

(d) based on the aggregate rewrite scores generated, query features of each query of said plurality of queries, and the rewrite scores generated for each query of the plurality of queries, generating a partitioning function by which to partition said plurality of queries into clusters;

(e) based on the partitioning function, repartitioning said plurality of queries into a new set of clusters;

repeating steps (a), (b), (c), (d) and (e) one or more times; and wherein the steps are performed by one or more computers.

10. The computer readable medium of claim 9, wherein the step of generating a query partitioning function includes:

for each query of said plurality of queries, selecting a recommended cluster based on a comparison of the rewrite scores generated for said each query and the aggregate scores generated for the recommended cluster; and wherein generating the partitioning function is based on the recommended cluster selected for each query of said plurality of queries;

in response to determining a new query belongs to a particular cluster, applying the rule set of that cluster to the particular query to generate suggested rewrites for the new query.

11. The computer readable medium of claim 9, the steps further including, for each query of said plurality of queries, for each cluster, selecting a subset of a threshold number of query rewrite policies that are associated with highest aggregate scores;

selecting a recommended cluster based on a comparison of the rewrite scores generated for said each query and the aggregate scores generated for the recommended cluster; and wherein generating the partitioning function is based on the recommended cluster selected for each query of said plurality of queries.

12. The computer readable medium of claim 1 wherein for a given rewrite policy the respective query rewrite providers is capped at a particular number of query rewrite providers.

13. The computer readable medium of claim 1 wherein a given rewrite policy involves multiple applications of the same query rewrite technique.

14. The computer readable medium of claim 1 wherein any query policy is capped at a particular number of query rewrite techniques for all queries.

15. The computer readable medium of claim 1 wherein:

the step of generating the plurality of suggested rewrites involves, for each query of said plurality of queries, creating a tree of nodes, wherein arcs between the nodes lead from a parent node to a child node, wherein each arc represents a query rewrite technique of a query rewrite provider of said query rewrite providers, wherein each descendant node represents a query rewrite policy comprising each query technique associated in the set of one or more arcs that lead from the root node to said each node.

16. The computer-readable medium of claim 15, wherein the root node represents the query.

* * * * *